United States Patent
Masuda et al.

(10) Patent No.: US 12,403,788 B2
(45) Date of Patent: Sep. 2, 2025

(54) POWER GENERATION SUPPORT SYSTEM

(71) Applicant: TOYOTA JIDOSHA KABUSHIKI KAISHA, Toyota (JP)

(72) Inventors: Taizo Masuda, Yokohama (JP); Yasunobu Seki, Nisshin (JP); Hiroki Awano, Susono (JP); Tomoko Nakamura, Naka-gun (JP); Tsuyoshi Kaneko, Nisshin (JP); Kosuke Yonekawa, Nisshin (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 47 days.

(21) Appl. No.: 18/378,197

(22) Filed: Oct. 10, 2023

(65) Prior Publication Data

US 2024/0149727 A1    May 9, 2024

(30) Foreign Application Priority Data

Nov. 8, 2022  (JP) ................ 2022-178681

(51) Int. Cl.
| | |
|---|---|
| *B60L 11/18* | (2006.01) |
| *B60L 53/51* | (2019.01) |
| *B60L 53/53* | (2019.01) |
| *B60L 53/60* | (2019.01) |

(52) U.S. Cl.
CPC .............. *B60L 53/60* (2019.02); *B60L 53/51* (2019.02); *B60L 53/53* (2019.02)

(58) Field of Classification Search
CPC ........... B60L 53/60; B60L 53/51; B60L 53/53
See application file for complete search history.

(56) References Cited

U.S. PATENT DOCUMENTS

| | | | |
|---|---|---|---|
| 2009/0288891 A1* | 11/2009 | Budge ................... | B60L 53/00 180/2.2 |
| 2011/0191266 A1 | 8/2011 | Matsuyama | |
| 2014/0214251 A1* | 7/2014 | Sugiyama ............. | B60L 58/20 903/930 |
| 2014/0312841 A1* | 10/2014 | Baba ...................... | B60L 55/00 320/109 |

(Continued)

FOREIGN PATENT DOCUMENTS

| | | |
|---|---|---|
| JP | 2011-158375 A | 8/2011 |
| JP | 2011-242305 A | 12/2011 |

(Continued)

*Primary Examiner* — Rexford N Barnie
*Assistant Examiner* — Esayas G Yeshaw
(74) *Attorney, Agent, or Firm* — Oliff PLC

(57) ABSTRACT

A power generation support system for a vehicle in which a plurality of solar cell panels are attached to a vehicle body, the power generation support system including: a estimation unit configured to estimate an amount of power generated per unit hour by the plurality of solar cell panels when the vehicle is to be parked in a scheduled parking area so that the front of the vehicle faces a first direction and estimate an amount of power generated per unit hour by the plurality of solar cell panels when the vehicle is to be parked in the scheduled parking area so that the front of the vehicle faces a second direction that is opposite to the first direction; and an output unit configured to output information about a direction in which the vehicle faces when it is to be parked in the scheduled parking area.

3 Claims, 4 Drawing Sheets

(56) References Cited

U.S. PATENT DOCUMENTS

2017/0038417 A1\* 2/2017 Nakagawa ............. G07C 5/008
2019/0176629 A1  6/2019 Go
2021/0006199 A1\* 1/2021 Kim ........................ H02S 30/20

FOREIGN PATENT DOCUMENTS

| JP | 2012-073077 A | 4/2012 |
| JP | 2016-141161 A | 8/2016 |
| JP | 2019-106761 A | 6/2019 |
| WO | 2011/010392 A1 | 1/2011 |
| WO | 2016/072165 A1 | 5/2016 |
| WO | 2022/003707 A1 | 1/2022 |

\* cited by examiner

POWER GENERATION SUPPORT SYSTEM

CROSS REFERENCE TO RELATED APPLICATIONS

This application is based upon and claims the benefit of priority from Japanese patent application No. 2022-178681, filed on Nov. 8, 2022, the disclosure of which is incorporated herein in its entirety by reference.

BACKGROUND

The present disclosure relates to a power generation support system.

In recent years, a vehicle including a solar cell panel mounted thereon has been developed. The related art is disclosed, for example, in Japanese Unexamined Patent Application Publication No. 2012-073077.

Japanese Unexamined Patent Application Publication No. 2012-073077 discloses an apparatus for a mobile body that determines a possible parking position, which is estimated to have the highest amount of solar radiation, among a plurality of possible parking positions and notifies it.

SUMMARY

Japanese Unexamined Patent Application Publication No. 2012-073077 does not disclose a proposal for a direction in which a vehicle should face in order to improve the power generation efficiency of a plurality of solar cell panels installed in the vehicle when the vehicle is to be parked in the possible parking position. In other words, in Japanese Unexamined Patent Application Publication No. 2012-073077, there is a problem that the power generation efficiency of a plurality of solar cell panels installed in a vehicle cannot be improved.

The present disclosure has been made in view of the aforementioned circumstances and an object thereof is to provide a power generation support system capable of improving the power generation efficiency of a plurality of solar cell panels installed in a vehicle.

A power generation support system according to the present disclosure is a power generation support system for a vehicle in which a plurality of solar cell panels are attached to a vehicle body, the power generation support system including: a estimation unit configured to estimate an amount of power generated per unit hour by the plurality of solar cell panels when the vehicle is to be parked in a scheduled parking area so that the front of the vehicle faces a first direction and estimate an amount of power generated per unit hour by the plurality of solar cell panels when the vehicle is to be parked in the scheduled parking area so that the front of the vehicle faces a second direction that is opposite to the first direction; and an output unit configured to output information about a direction in which the vehicle faces when it is to be parked in the scheduled parking area based on a result of the estimation by the estimation unit. The power generation support system can propose a direction in which a vehicle should face in order to improve the power generation efficiency of the plurality of solar cell panels installed in the vehicle when the vehicle is to be parked in a scheduled parking area. The driver who has received the proposal can park the vehicle in the direction in which the power generation efficiency is high. Thus, the power generation support system can improve the power generation efficiency of a plurality of solar cell panels installed in a vehicle.

According to the present disclosure, it is possible to provide a generation support system capable of improving the power generation efficiency of a plurality of solar cell panels installed in a vehicle.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
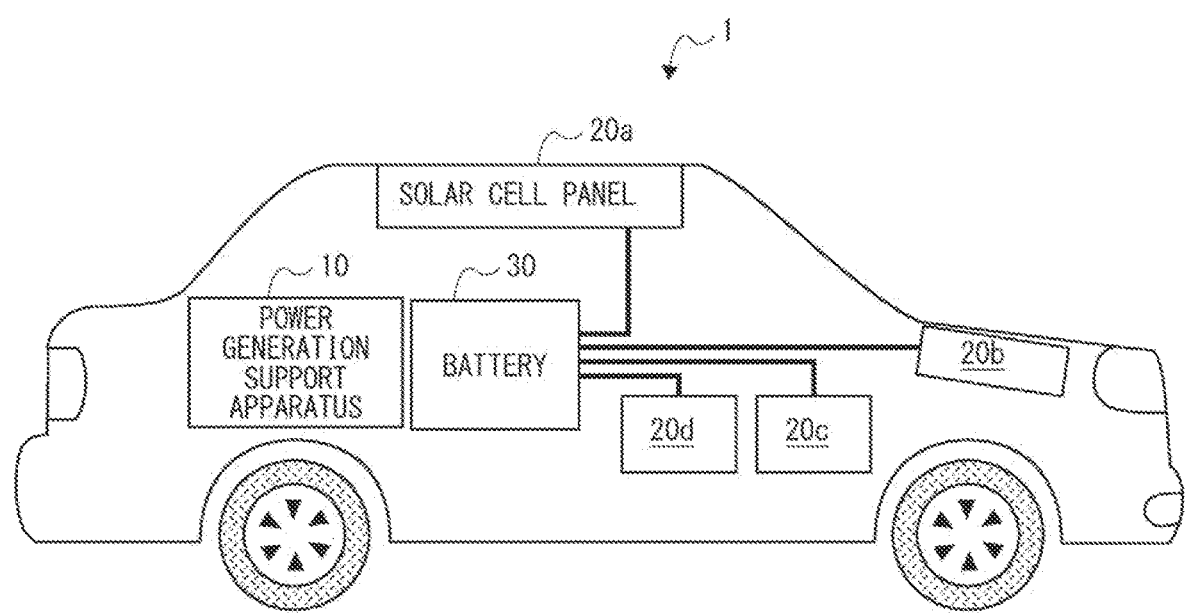
FIG. 1 is a diagram showing an example of a vehicle to which a generation support system according to a first embodiment is applied.

The present disclosure will be described hereinafter with reference to an embodiment of the present disclosure. However, the following embodiment is not intended to limit the scope of the disclosure according to the claims. Further, all the components/structures described in the embodiment are not necessarily indispensable as means for solving the problem. For the clarification of the description, the following descriptions and the drawings are partially omitted and simplified as appropriate. The same elements are denoted by the same reference numerals or symbols throughout the drawings, and redundant descriptions are omitted as necessary.

First Embodiment

FIG. 1 is a diagram showing an example of a vehicle 1 to which a generation support system according to a first embodiment is applied. The power generation support system according to the first embodiment can propose a direction in which a vehicle should face in order to improve the power generation efficiency of the plurality of solar cell panels installed in the vehicle when the vehicle is to be parked in a scheduled parking area. The driver who has received the proposal can park the vehicle in the direction in which the power generation efficiency is high. Therefore, the power generation support system according to this embodiment can improve the power generation efficiency of a plurality of solar cell panels installed in a vehicle. The details of the above configuration will be described below.

As shown in FIG. 1, the power generation support system according to this embodiment is mounted on the vehicle 1 and includes a power generation support apparatus 10, solar cell panels 20a to 20d (hereinafter also referred to simply as a plurality of solar cell panels 20), and a battery 30. The power generation support apparatus 10 can also be referred to as a power generation support system by itself. The power generation support apparatus 10 is installed in such a way that it can monitor the status of power generation by the solar cell panels 20a to 20d and the charging status of the battery 30.

Figure 2:
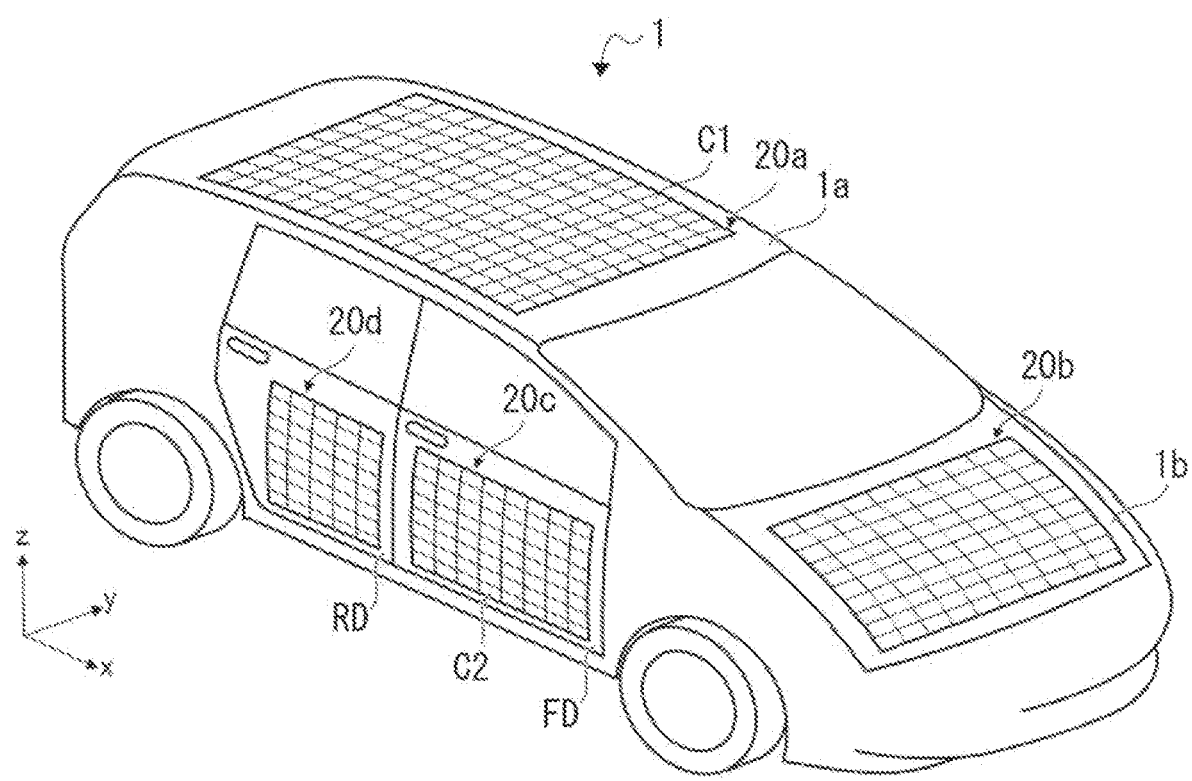
FIG. 2 is a perspective view showing the vehicle to which the generation support system according to the first embodiment is applied.

FIG. 2 is a perspective view showing an example of an external appearance of the vehicle 1. Needless to say, right-handed xyz-orthogonal coordinate systems shown in FIG. 2 are shown just for facilitating the explaining of positional relationships among components. In the example shown in FIG. 2, the x-axis positive direction indicates the vehicle front direction (that is, the x-axis direction indicates the vehicle front and rear direction), the y-axis direction indicates the vehicle width direction, and the z-axis positive direction indicates the vertical upward direction (that is, the z-axis direction indicates the vehicle height direction).

As shown in FIG. 2, the vehicle 1 includes the solar cell panels 20a to 20d attached to a vehicle body of the vehicle 1. Specifically, first, the vehicle 1 includes the solar cell panel 20a attached to a roof 1a, which is an upper surface of the vehicle body, and the solar cell panel 20b mounted on a hood 1b, which is also an upper surface of the vehicle body. The vehicle 1 also includes a pair of the solar cell panels 20c attached to a pair of front doors FD, which are side surfaces of the vehicle body, and a pair of the solar cell panels 20d attached to a pair of rear doors RD, which are also side surfaces of the vehicle body.

Note that the vehicle 1 only needs to include at least two of the solar cell panels 20a to 20d. Further, the vehicle 1 may also include an additional solar cell panel 20e (not shown) attached at another position in the vehicle body in addition to the plurality of solar cell panels 20a to 20d.

Further, the vehicle 1 may be any kind of vehicle as long as it includes two or more of the solar cell panels 20a to 20d. For example, the vehicle 1 is not limited to a battery electric vehicle, a hybrid electric vehicle, a fuel cell electric vehicle, and the like that can be driven by electric power, and may instead be an engine vehicle that can be driven by an engine.

In the vehicle 1, each of the solar cell panels 20a and 20b attached to the upper surface of the vehicle body includes a plurality of solar cells C1 arranged in the vehicle width direction (y-axis direction) and the vehicle front and rear direction (x-axis direction). In the example shown in FIG. 2, in each of the solar cell panels 20a and 20b, the plurality of solar cells C1 are arranged in a matrix. Further, each of the solar cell panels 20c and 20d attached to the side surface of the vehicle body includes a plurality of solar cells C2 arranged in the vehicle front and rear direction (x-axis direction) and the vehicle height direction (z-axis direction). In the example shown in FIG. 2, in each of the solar cell panels 20c and 20d, the plurality of solar cells C2 are arranged in a matrix.

The battery 30, which is connected to the plurality of solar cell panels 20 via charging cables, stores electricity generated by each of the plurality of solar cell panels 20. The battery 30 can be used as a backup power source or as a power source if the vehicle 1 is a battery electric vehicle.

The power generation support apparatus 10 is an apparatus that supports power generation by the plurality of solar cell panels 20. Specifically, the power generation support apparatus 10 is an apparatus that proposes a direction in which the vehicle 1 should face in order to improve the power generation efficiency of the plurality of solar cell panels installed in the vehicle 1 when the vehicle is to be parked in a scheduled parking area.

Figure 3:
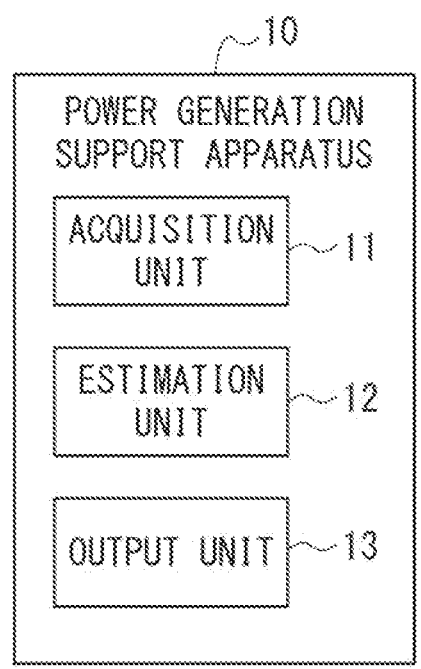
FIG. 3 is a block diagram showing an example of a configuration of a power generation support apparatus according to the first embodiment.

FIG. 3 is a block diagram showing an example of a configuration of the power generation support apparatus 10.

As shown in FIG. 3, the power generation support apparatus 10 includes an acquisition unit 11, an estimation unit 12, and an output unit 13.

The acquisition unit 11 acquires information contributing to the power generation efficiency of the plurality of solar cell panels 20. Specifically, the acquisition unit 11 acquires information such as position information of a scheduled parking area, a scheduled parking time, a surrounding environment, and a weather forecast. These pieces of information are input from outside via a mobile terminal owned by a driver or an operation terminal in the vehicle, or supplied through a network from other external apparatuses.

The scheduled parking area is, for example, a parking lot installed at home or a shop. For example, it is possible to specify the position of the sun as seen from the scheduled parking area based on the position information of the scheduled parking area, the scheduled parking time, and the like. Further, it is possible to specify obstacles that may block sunlight based on information about the surrounding environment of the scheduled parking area. These specifications are performed, for example, by the estimation unit 12.

Note that it is assumed that there are two method for parking the vehicle 1 in a scheduled parking area, that is, a method for parking the vehicle 1 so that its front faces a first direction and a method for parking the vehicle 1 so that its front faces a second direction that is opposite to the first direction.

Based on information acquired by the acquisition unit 11 and respective places where the plurality of solar cell panels 20 are disposed (including the angles) relative to the vehicle 1, the estimation unit 12 estimates the amount of power generated per unit hour by the plurality of solar cell panels 20 when the vehicle 1 is parked in a scheduled parking area so that its front faces the first direction, and the amount of power generated per unit hour by the plurality of solar cell panels 20 when the vehicle 1 is parked in the scheduled parking area so that its front faces the second direction.

The output unit 13 outputs information about a direction in which the vehicle 1 faces when it is to be parked in the scheduled parking area based on a result of the estimation by the estimation unit 12. For example, the output unit 13 outputs information indicating that it is recommended that the vehicle 1 be parked in a direction in which it is estimated that the amount of power generated per unit time by the plurality of solar cell panels 20 will be high. The information output from the output unit 13 is output by voice from a speaker in the vehicle or a speaker of a mobile terminal owned by a driver, or displayed on a monitor in the vehicle or on a monitor of a mobile terminal owned by a driver, for example, through a network. The driver who has received the notification can park the vehicle 1 in the direction in which the power generation efficiency is high.

(Operations of the Power Generation Support Apparatus 10)

Figure 4:
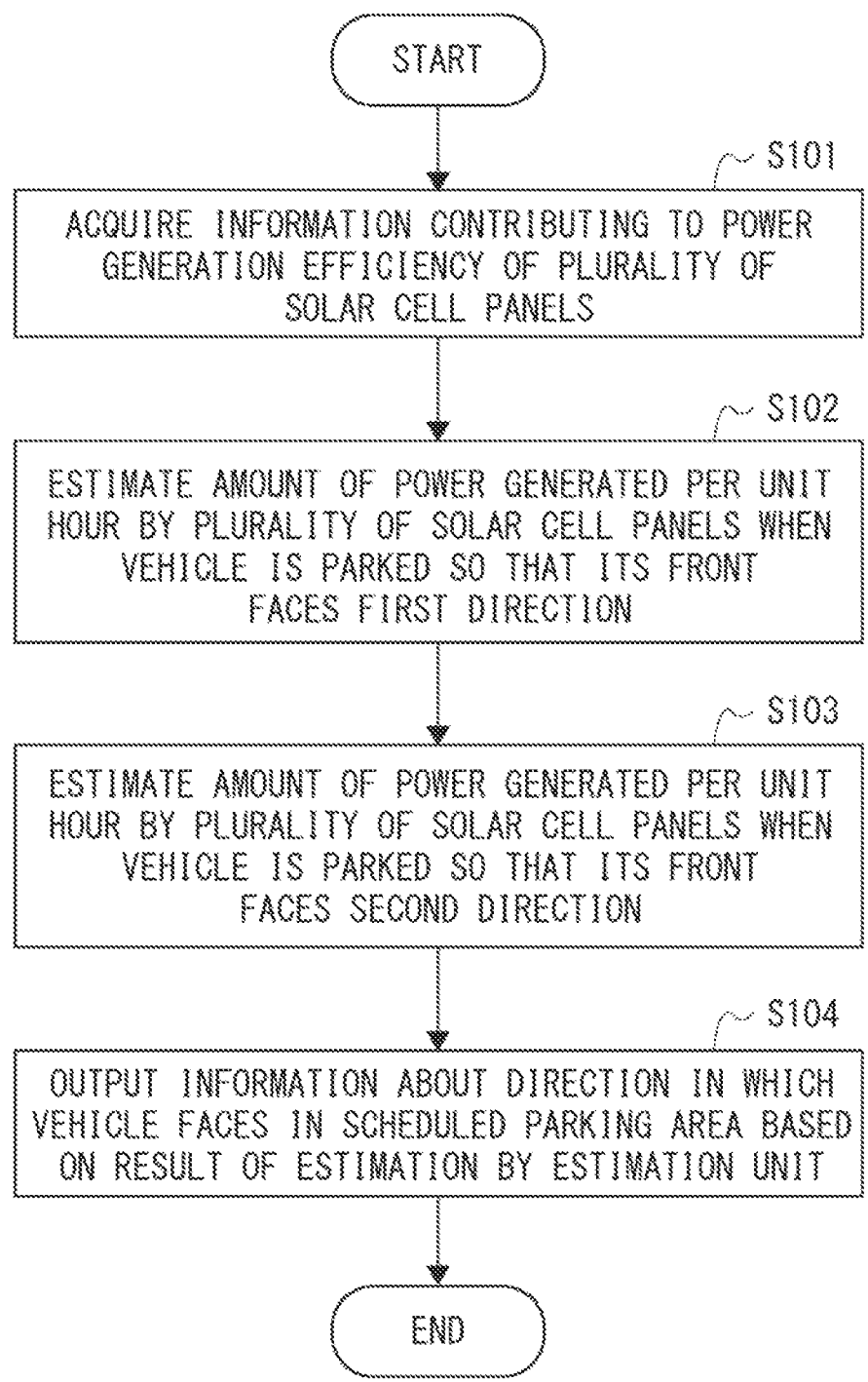
FIG. 4 is a flowchart showing operations of the power generation support apparatus according to the first embodiment.

Next, the operations of the power generation support apparatus 10 will be described with reference to FIG. 4. FIG. 4 is a flowchart showing the operations of the power generation support apparatus 10.

First, the power generation support apparatus 10 acquires information contributing to the power generation efficiency of the plurality of solar cell panel (Step S101). Specifically, the power generation support apparatus 10 acquires information such as position information of a scheduled parking area, a scheduled parking time, a surrounding environment, and a weather forecast.

Then, based on the acquired information and respective places where the plurality of solar cell panels 20 are disposed (including the angles) relative to the vehicle 1, the power generation support apparatus 10 estimates the amount of power generated per unit hour by the plurality of solar cell panels 20 when the vehicle 1 is parked in a scheduled parking area so that its front faces the first direction (Step S102), and estimates the amount of power generated per unit hour by the plurality of solar cell panels 20 when the vehicle 1 is parked in the scheduled parking area so that its front faces the second direction (Step S103).

Then, the power generation support apparatus 10 outputs information about a direction in which the vehicle 1 faces when it is to be parked in a scheduled parking area based on the estimated result (Step S104). Specifically, the power generation support apparatus 10 outputs information indicating that it is recommended to park the vehicle 1 in a direction in which it is estimated that the amount of power generated per unit time by the plurality of solar cell panels will be high. The driver who has received the notification can park the vehicle 1 in the direction in which the power generation efficiency is high.

As described above, the power generation support system according to this embodiment can propose a direction in which the vehicle 1 should face in order to improve the power generation efficiency of the plurality of solar cell panels 20 installed in the vehicle 1 when it is to be parked in a scheduled parking area. The driver who has received the proposal can park the vehicle 1 in the direction in which the power generation efficiency is high. Therefore, the power generation support system according to this embodiment can improve the power generation efficiency of a plurality of solar cell panels installed in the vehicle 1.

The present disclosure is not limited to the above-described embodiment and may be changed as appropriate without departing from the scope and spirit of the present disclosure. Further, the present disclosure relates to use of a solar photovoltaic panel, and contributes to carbon neutrality, decarbonization, and Sustainable Development Goals (SDGs).

Further, in the present disclosure, it is possible to implement all or part of processing performed by the power generation support apparatus 10 by causing a Central Processing Unit (CPU) to execute a computer program.

The program described above includes a set of instructions (or software code) for having the computer perform one or more functions described in the embodiment when read into the computer. The program may be stored on a non-temporary computer-readable medium or a physical storage medium. By way of example, but not limitation, a computer-readable medium or a physical storage medium includes RAM (Random-Access Memory), ROM (Read-Only Memory), flash memory, SSD (Solid-State Drive) or other memory technology, CD-ROM, DVD (Digital Versatile Disc), Blu-ray® disk or other optical disk storage, magnetic cassette, magnetic tape, magnetic disk storage or other magnetic storage device. The program may be transmitted on a temporary computer-readable medium or communication medium. By way of example and not limitation, a temporary computer-readable medium or communication medium may include an electrical, optical, acoustic or other form of propagating signal.

The whole or part of the embodiment disclosed above can be described as, but not limited to, the following supplementary notes.

(Supplementary Note 1)

A power generation support method for a vehicle in which a plurality of solar cell panels are attached to a vehicle body, the power generation support method comprising:

estimating an amount of power generated per unit hour by the plurality of solar cell panels when the vehicle is to be parked in a scheduled parking area so that the front of the vehicle faces a first direction;

estimating an amount of power generated per unit hour by the plurality of solar cell panels when the vehicle is to be parked in the scheduled parking area so that the front of the vehicle faces a second direction that is opposite to the first direction; and outputting information about a direction in which the vehicle faces when it is to be parked in the scheduled parking area based on a result of the estimation.

(Supplementary Note 2)

A control program for causing a computer to execute power generation support processing for a vehicle in which a plurality of solar cell panels are attached to a vehicle body, the power generation support processing comprising:

estimating an amount of power generated per unit hour by the plurality of solar cell panels when the vehicle is to be parked in a scheduled parking area so that the front of the vehicle faces a first direction;

estimating an amount of power generated per unit hour by the plurality of solar cell panels when the vehicle is to be parked in the scheduled parking area so that the front of the vehicle faces a second direction that is opposite to the first direction; and outputting information about a direction in which the vehicle faces when it is to be parked in the scheduled parking area based on a result of the estimation.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A power generation support system for a vehicle in which a plurality of solar cell panels are attached to a vehicle body, the power generation support system comprising:

an acquisition unit configured to acquire at least position information of a scheduled parking area and information about a scheduled parking time of the vehicle;

an estimation unit configured to estimate an amount of power generated per unit hour by the plurality of solar cell panels when the vehicle is to be parked in the scheduled parking area so that a front of the vehicle faces a first direction and estimate an amount of power generated per unit hour by the plurality of solar cell panels when the vehicle is to be parked in the scheduled parking area so that the front of the vehicle faces a second direction that is opposite to the first direction; and an output unit configured to output information about a direction in which the vehicle faces when it is to be parked in the scheduled parking area based on a result of the estimation by the estimation unit;

the estimation unit estimates an amount of power generated per unit hour by the plurality of solar cell panels when the vehicle is to be parked in the scheduled parking area so that the front of the vehicle faces the first direction and estimates an amount of power generated per unit hour by the plurality of solar cell panels when the vehicle is to be parked in the scheduled parking area so that the front of the vehicle faces the second direction based on a position of the sun on a date and time when the vehicle is to be parked, respective places where the plurality of solar cell panels are disposed, and a weather forecast for the scheduled parking area;

the acquisition unit acquires the position information of the scheduled parking area and the information about the scheduled parking time via a mobile terminal owned by a driver of the vehicle; and the output unit outputs an output content to the mobile terminal owned by the driver of the vehicle.

2. The power generation support system according to claim 1, wherein the output unit outputs information indicating that it is recommended that the vehicle be parked in a direction in which the estimation unit has estimated that an amount of power generated per unit time will be high.

3. The power generation support system according to claim 1, further comprising a battery configured to store electricity generated by each of the plurality of solar cell panels.

\* \* \* \* \*